Feb. 3, 1970  L. C. SCHAFER  3,493,138
HYDRAULIC CONTROL AND DRIVE SYSTEM FOR A FORKLIFT TRUCK
Filed Jan. 25, 1968  3 Sheets-Sheet 1

INVENTOR.
LOREN SCHAFER
BY
ATTORNEY

INVENTOR.
LOREN SCHAFER
BY
ATTORNEY

Feb. 3, 1970 L. C. SCHAFER 3,493,138
HYDRAULIC CONTROL AND DRIVE SYSTEM FOR A FORKLIFT TRUCK
Filed Jan. 25, 1968
3 Sheets-Sheet 3

INVENTOR.
LOREN SCHAFER
BY
ATTORNEY

United States Patent Office 3,493,138
Patented Feb. 3, 1970

3,493,138
HYDRAULIC CONTROL AND DRIVE SYSTEM
FOR A FORKLIFT TRUCK
Loren C. Schafer, 245 Willow Drive,
South Bend, Ind. 46617
Continuation-in-part of application Ser. No. 514,823,
Dec. 20, 1965. This application Jan. 25, 1968, Ser.
No. 700,562
Int. Cl. B66f 9/22; F16k 11/07
U.S. Cl. 214—674                                    1 Claim

ABSTRACT OF THE DISCLOSURE

A hydraulic forklift having working parts thereof controlled by at least one spool valve which is longitudinally shiftable by rotational movement thereof and which includes a land having a slightly reduced end portion adapted to span a flow path in the valve.

---

This application is a continuation-in-part of my copending application, Ser. No. 514,823, filed Dec. 20, 1965, now Patent No. 3,401,764.

This invention relates to a hydraulic control for forklift trucks.

The primary object of this invention is to provide a hydraulic control for a forklift truck operative to govern the wheel drive of the truck, the fork-elevating means of the truck, and the mast tilting means of the truck.

A further object is to provide a control of this character having a novel means for metering the flow of liquid through control valves and for regulating, not only the functioning speed of hydraulic components, but also regulating such functioning at two different rates relative to a unit of movement of a controlling element at different portions of the stroke thereof.

A further object is to provide a hydraulic control of this character having a spool type valve with a novel rotary action spool to accommodate long spool travel and accurate control of flow of oil through small increments of change of position of the spool.

Other objects will be apparent from the following specification.

Figure 1:
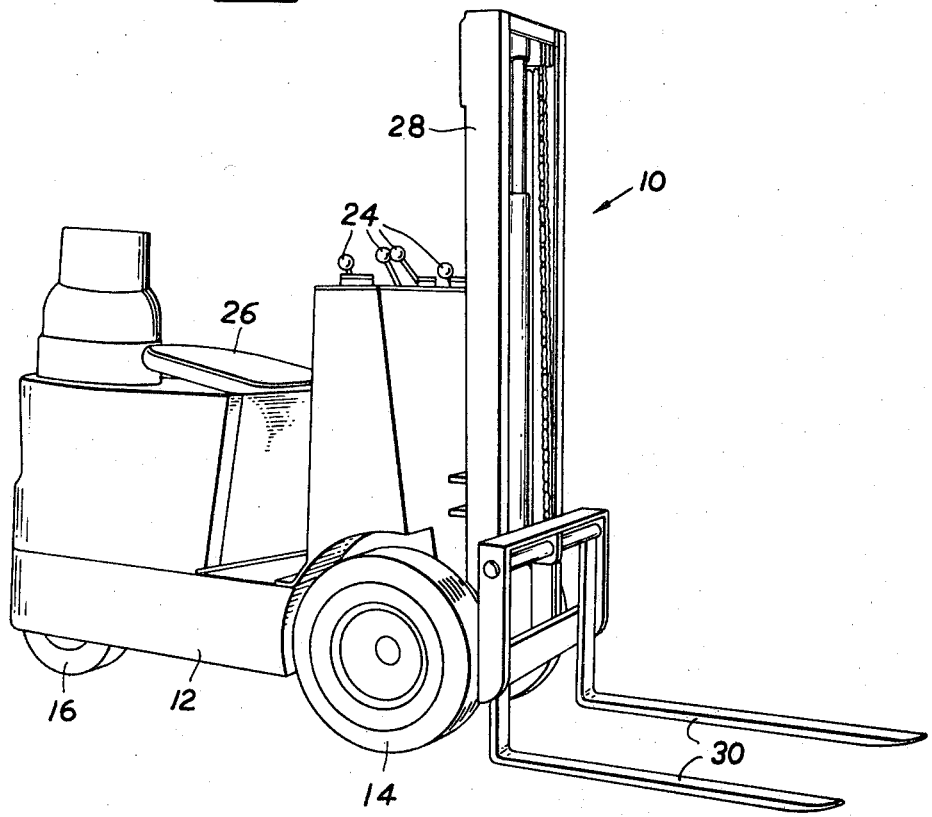
FIG. 1 is a perspective view of a forklift truck utilizing my new hydraulic control.

Referring to the drawings, and particularly to FIG. 1, the numeral 10 designates a forklift truck having a chassis 12 which is preferably provided with counterbalance weights and is supported upon front driving wheels 14 and one or more rear steering wheels 16. The chassis mounts a prime mover 18 or a drive motor, such as a gasoline engine or an electric motor. A hydraulic pump 20 is driven by prime mover 18 and a liquid reservoir 22 and other components of a hydraulic system are also mounted on the chassis. Suitable control members 24 for the hydraulic system and steering means are located within convenient reach of an operator from the seat 26. The chassis 12 mounts a tiltable mast 28 on which forklift arms 30 are vertically adjustable between elevated and lowered positions. Mast 28 may be of any construction of the character well understood in the art.

Figure 2:
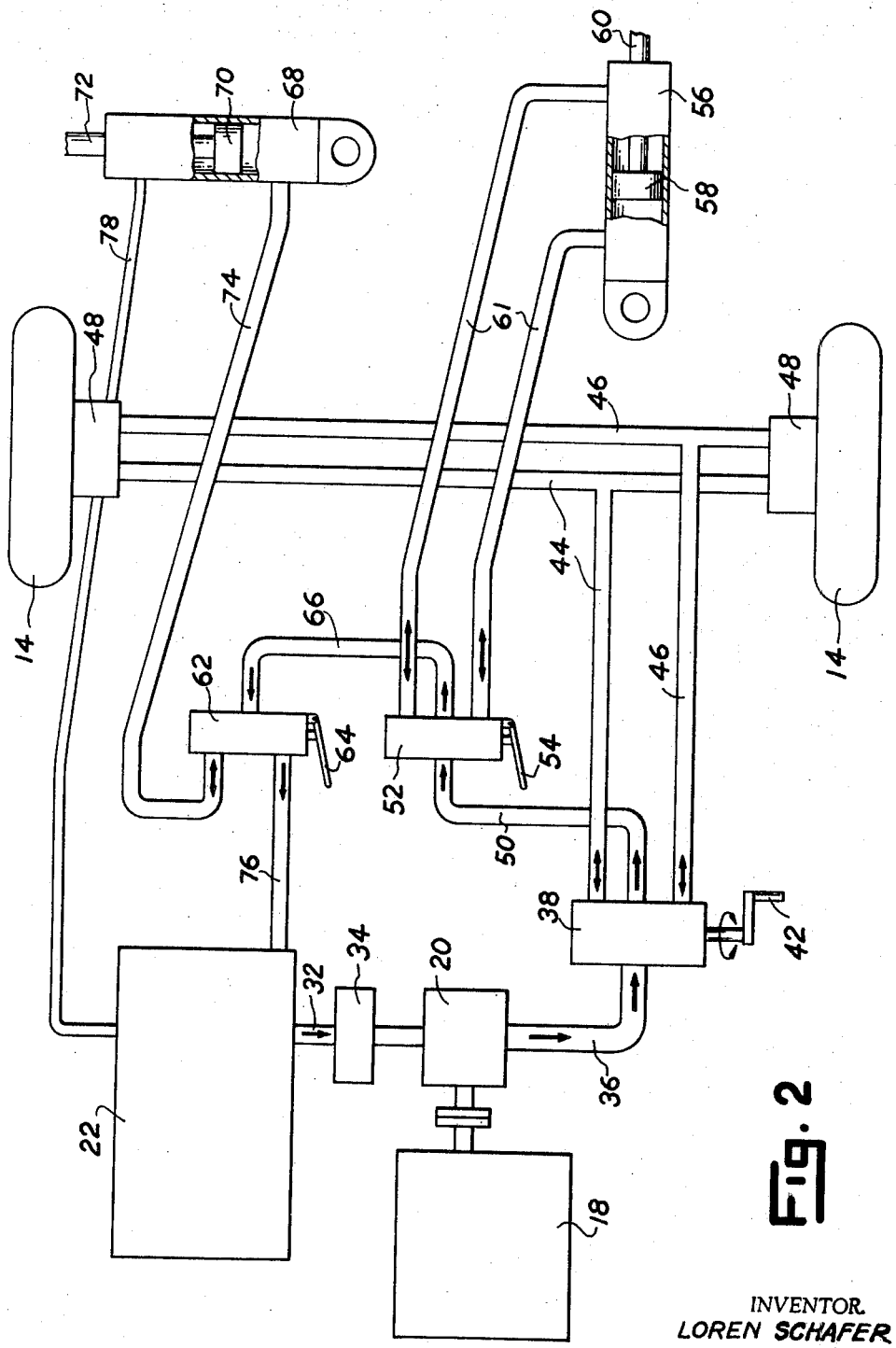
FIG. 2 is a schematic illustration of the hydraulic control.
Figure 3:
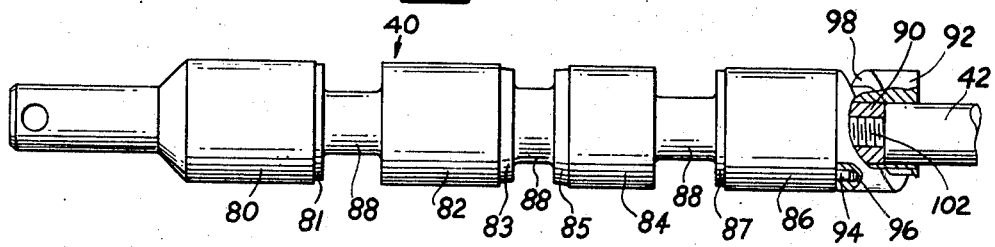
FIG. 3 is a side elevational view of a novel spool element utilized in a valve of my new hydraulic control.

The hydraulic control is illustrated schematically in FIG. 2. A line or conduit 32 connects with the reservoir 22 and the pump 20 and preferably has a filter 34 interposed therein. A pump outlet line 36 extends to a first control valve 38 which preferably is of a spool type and which preferably includes a spool 40, as illustrated in FIG. 3, which will be described hereafter. Valve 38 is adjusted or controlled by suitable manually operated member, such as a crank 42. A pair of lines 44 and 46 are connected to control valve 38 and extend to reversible hydraulic wheel motors 48 serving to drive the wheels 14. The wheel motors are preferably of a high torque low speed type and are preferably connected in parallel so as to provide differential action to accommodate short radius turning of the truck.

A line 50 connects the first control valve 38 with a second control valve 52 which is preferably a double action spool type valve controlled by actuator handle 54. A double acting power member, consisting of a cylinder 56 mounted on the chassis and a piston reciprocable in the cylinder and connected by a ram 60 with the tilting mast, has connection with the valve 52 through the conduits 61. Thus manipulation of the control handle 54 of the valve 52 will regulate actuation of mast-tilting member 56, 58 in selected direction, or serves to hold the mast in selected position by shutting off liquid flow from valve 52 through lines 61.

A single action valve 62, preferably of the spool type and having a valve actuating control handle 64, is connected at 66 to the outlet port of the valve 52. Connection 66 is herein shown diagrammatically as a conduit, but it will be understood that this is illustrative only inasmuch as the valves 52 and 62 may be a part of a single valve assembly or unit having two independently operable spools. A single action power member, consisting of a cylinder 68 and a piston 70, is mounted on the chassis, and the piston 70 actuates a ram 72 mounted upon the mast and connected with the forklift arms 30. A line 74 provides a connection between the valve 62 and the cylinder 68 of the power member. The arrangement is such that in one valve setting the line 74 delivers liquid under pressure to the fork lifting cylinder 68 to elevate the fork arms, and in another valve setting line 74 returns liquid from the cylinder 68 to the valve 62 for flow therethrough to a return line 76 connected to the reservoir 22 to permit the ram to be lowered by the weight of the fork arms 30 and the load carried thereby. A relief line 78 may connect the upper end of the cylinder 68 to the reservoir 22. The relief line 78 provides for gravitational flow of liquid which may leak past piston 70 into the upper end of the fork lift hoisting cylinder 68.

The spool 40 of the valve 38 is preferably of a construction as illustrated in FIG. 3 and is provided with a plurality of spaced coaxial cylindrical portions or lands of any selected number, such as the lands 80, 82, 84 and 86, which form parts of an integral or unitary structure being interconnected by reduced neck parts 88. Each of the cylindrical spool parts or lands 80, 82, 84, 86, or selected ones thereof are provided with slightly reduced coaxial circular portions at least at one end thereof, as illustrated at 81, 83, 85 and 87, adjacent one of the reduced neck parts 88 of the spool.

Figure 4:
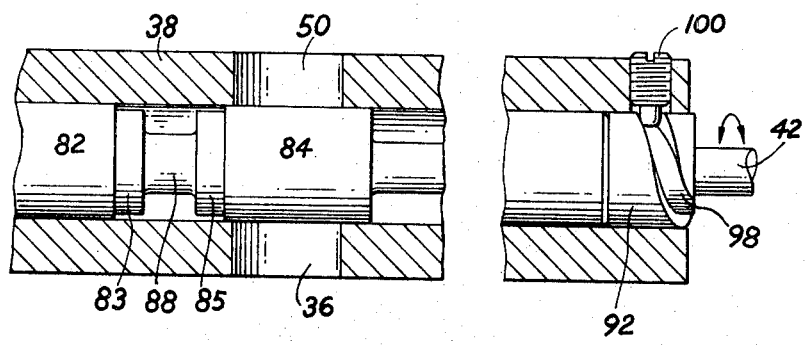
FIG. 4 is a schematic view illustrating one operative position of a valve utilizing my new valve spool.
Figure 5:
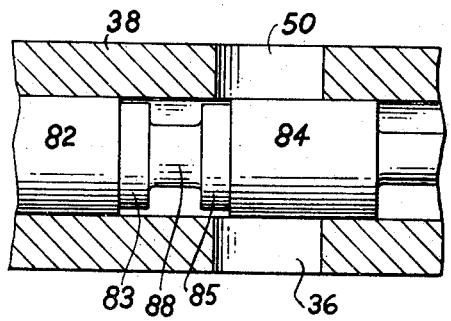
FIG. 5 is a schematic view illustrating a second adjustment position of the valve using my new spool.
Figure 6:
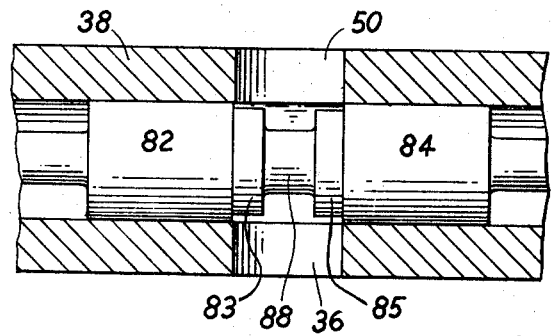
FIG. 6 is a schematic view illustrating a third operating position of a valve utilizing my new valve spool.

The arrangement and functioning of the valve 38 is illustrated in FIGS. 4, 5 and 6, in which a schematic illustration of a part of the valve body and spool, an inlet connected with conduit 36 and an outlet connected with conduit 50, are shown. The inlet and outlet both preferably have a longitudinal dimension equal to the longitudinal spacing between the ends of adjacent spools, such as ends 82 and 84; that is, a spacing equal to the axial dimensions of the reduced land parts 83 and 85 plus the axial dimension of the intervening reduced neck part 88 of the spool. The lands 82 and 84 will each have an axal dimension adequate to completely span and close the inlet 36 and the outlet 50.

FIG. 4 illustrates a position of the spool 40 in the valve 38 in which the land 84 completely spans and closes both the inlet 36 and the outlet 50, so that no flow occurs through the valve between the inlet 36 and outlet 50.

FIG. 5 illustrates a position in which land 84 has been displaced slightly from closed position so that a reduced part 85 thereof is partly in register with inlet 36 and the outlet 50. Inasmuch as the cross-sectional dimension or area of the part 85 is only slightly less than the cross-sectional dimension or area of the land 84, only a slight or restricted path of flow is provided between inlet 36 and outlet 50 in the FIG. 5 position. This is particularly important in the drive control valve 38 which controls the operation of the wheel motors 48, for which purpose the lands 80 and 86 with reduced parts 81 and 87 serve the function of regulating the rate of flow to the lines 44 and 46 from the valve 38. Thus it will be apparent that the arrangement makes possible a very slow rate of operation of the wheel motors when one of the lands 80 and 86 is displaced only slightly from closing position. In practical terms it will be seen that this arrangement makes it possible to drive a fork truck at normal operating speed to a point adjacent to the point of use, and then to greatly reduce the speed and "inch" the truck to its final operating position.

Full speed or full open position of the valve is shown in FIG. 6, at which time unrestricted flow occurs through the valve 38 to the line 50. It will be understood that in this position the valve lands 80 and 86 will fully close the lines 44 and 46 so as to hold the vehicle in a brake-operating position.

It will be observed that the control valve 38 permits flow in a number of different paths. Thus flow through the valve 38 can occur from conduit 36 only to the conduit 50, or flow can occur through valve 38 from conduit 36 to line 44, motor 48, line 46, back through valve 38 to the line 50, or flow can occur from line 36 through valve 38 to line 46, through wheel motors 48, back through conduit 44, and valve 38 to the conduit 50. In all of these positions it will be observed that flow from conduit 36 ultimately passes to conduit 50, and that in the various adjustments of the valve to control the drive wheels, various divisions and changes of path may occur before the ultimate delivery of fluid to the conduit 50.

In order to facilitate close control of the setting of the spool and the valve 38, it will preferably be actuated by a rotary cam of the construction illustrated in FIG. 3. Thus, one end of the spool will preferably have a reduced end part 90, on which is mounted a cylindrical cam 92 held in selected position by any suitable means, such as a pin 94 projecting from the end of the land 86 spaced from the reduced spool end part 90 and fitting into a socket 96 formed in the inner end of the cylindrical cam 92. If desired, a plurality of circumferentially spaced pockets may be provided to selectively receive pin 94. Cam 92 is characterized by a helical cam groove 98 into which may project a pin 100 carried by the valve casing, as illustrated in FIG. 4. The reduced spool end part 90 will preferably have a screw-threaded central or axial bore to receive a reduced screw-threaded part 102 mounted on the end of the crank 42. It will be apparent that the lead of the cam groove 98 will determine the rate of axial movement of the spool upon rotation of the cam to any predetermined angle. Thus if close control or accuracy of control is desired, lead of the cam groove will be short, or, if rapid movement of the valve spool through a long stroke is desired, a long lead of the cam groove will provide that result. The latter may be advantageous in some instances and can be provided without loss of sensitivity of control for "inching" the drive wheels when necessary by reason of the flow-restricting function provided by the slightly reduced portions 81, 83, 85 and 87 of the valve spool lands 80, 82, 84 and 86, respectively.

It will be observed that the valves 38, 52 and 62 are arranged in series. This is important in order to accommodate simultaneous functioning of the wheel motors 48, the mast-tilting unit 56, 58, and the forklift unit 68, 70. The valve 52 is of a double-acting character and accommodates the following flow paths respectively: Flow from conduit 50 direct to conduit 66; flow from conduit 50 to a selected one of the conduits 61, and return flow from the other of said conduits through the valve 52 to the conduit 66.

The valve 62 is preferably of the single action type and normally will accommodate flow from conduit 66 to the line 76 connected to the reservoir 22. However, flow may occur through the valve from line 66 to conduit 74 to operate the forklift power member 68, 70. The valve 62 will also provide return flow from conduit 74 to the discharge line 76 in one setting so as to permit lowering of the forks by the weight thereof.

Each of the valves 38, 52 and 62 may be of conventional construction well understood in the art and, therefore, only schematic illustration thereof has been provided herein.

I claim:
1. In a forklift truck having driving wheels, a tiltable mast, vertically shiftable forks on said mast, hydraulic wheel drive means, hydraulic mast tilting means, hydraulic fork elevating means, a control system comprising a hydraulic circuit including a pump, a reservoir, a plurality of valves, conduits connecting said valves in a series related circuit including said pump and reservoir, and conduits connecting each of said wheel drive means, mast tilting means and hydraulic fork elevating means to one of said valves to be controlled thereby, each valve selectively controlling liquid flow to the hydraulic means controlled thereby in all operative positions, the improvement wherein at least one of said valves includes a shiftable spool valve element having a land and an adjacent reduced neck part, a cylindrical cam carried by said spool, means for rotating said spool, and means carried by said valve and engaged by said cam for advancing said spool endwise incident to rotation thereof, said land adapted to span an aperture forming part of a valve flow path to close said valve and said reduced neck part adapted to span said aperture to open said valve upon selective movement of said spool valve element, said land including a slightly reduced portion at the end thereof adjacent said reduced neck part to restrict flow therearound to said aperture during a portion of the stroke of said spool valve element in which the reduced portion of said land at least partially spans said aperture.

References Cited

UNITED STATES PATENTS

| 1,723,066 | 8/1929 | Ogden | 251—215 |
| 2,112,466 | 3/1938 | Maloon | 60—52 |
| 2,320,601 | 6/1943 | Howell | 214—674 |
| 2,919,679 | 1/1960 | Lincoln et al. | 137—625.69 X |
| 3,098,574 | 7/1963 | De Marco | 214—674 |
| 3,174,510 | 3/1965 | Nelson | 251—205 |
| 3,357,451 | 12/1967 | Tennis | 137—596 |

FOREIGN PATENTS

| 134,759 | 11/1919 | Great Britain. |
| 636,552 | 2/1962 | Canada. |

GERALD M. FORLENZA, Primary Examiner

RAYMOND B. JOHNSON, Assistant Examiner

U.S. Cl. X.R.

137—596